(12) United States Patent
Fiorinotto

(10) Patent No.: US 11,067,148 B2
(45) Date of Patent: Jul. 20, 2021

(54) HYDRAULIC DAMPER

(71) Applicant: The Dynamic Engineering Solution Pty Ltd, Edinburgh Parks (AU)

(72) Inventor: Oscar Fiorinotto, Edinburgh Parks (AU)

(73) Assignee: The Dynamic Engineering Solution Pty Ltd, Holden Hill (AU)

( * ) Notice: Subject to any disclaimer, the term of this patent is extended or adjusted under 35 U.S.C. 154(b) by 0 days.

(21) Appl. No.: 16/864,841

(22) Filed: May 1, 2020

(65) Prior Publication Data

US 2020/0347904 A1    Nov. 5, 2020

(30) Foreign Application Priority Data

May 3, 2019   (AU) ............................... 2019901520

(51) Int. Cl.
  *F16F 9/12*   (2006.01)
  *F16F 9/18*   (2006.01)

(52) U.S. Cl.
  CPC ............... *F16F 9/125* (2013.01); *F16F 9/18* (2013.01)

(58) Field of Classification Search
  CPC ...... F16F 9/04; F16F 9/125; F16F 9/18; F16F 9/48; F16F 9/486; F16F 9/49
  USPC ........................................... 188/316–322.15
  See application file for complete search history.

(56) References Cited

U.S. PATENT DOCUMENTS

| | | | | |
|---|---|---|---|---|
| 4,588,053 A | * | 5/1986 | Foster | F16F 9/512 137/513.3 |
| 4,958,706 A | * | 9/1990 | Richardson | F16F 9/096 188/277 |
| 4,973,854 A | * | 11/1990 | Hummel | B60G 15/12 137/529 |
| 5,018,607 A | * | 5/1991 | Hardtke | F16F 9/3214 137/512.5 |
| 5,249,652 A | * | 10/1993 | Leitzman | F16F 9/5126 188/281 |
| 5,954,167 A | * | 9/1999 | Richardson | F16F 9/504 188/275 |
| 5,988,330 A | * | 11/1999 | Morris | B60G 15/062 188/319.1 |

(Continued)

FOREIGN PATENT DOCUMENTS

EP    2166250 A1    3/2010

*Primary Examiner* — Vishal R Sahni
(74) *Attorney, Agent, or Firm* — Erickson Kernell IP, LLC; Kent R. Erickson

(57) ABSTRACT

A hydraulic damper includes a piston slidable within a cylinder and dividing the cylinder into first and second chambers and a piston rod for driving the piston, the piston rod including a fluid passageway in fluid communication with the first and second fluid chambers wherein the piston is slidably moveable along the cylinder in compression and rebound, where compression results in fluid flowing through the passageway from the first to the second fluid chamber, and rebound results fluid flowing through the passageway from the second to the first fluid chamber. An adjustment mechanism located within the fluid passageway includes a compression member and a tapered valve head for adjusting the restriction of fluid flow through the passageway when the piston is in compression and a rebound adjustment member and a tapered valve head for adjusting the restriction of fluid flow through the passageway when the piston is in rebound.

12 Claims, 11 Drawing Sheets

(56) References Cited

U.S. PATENT DOCUMENTS

| | | | |
|---|---|---|---|
| 6,360,857 B1 | 3/2002 | Fox et al. | |
| 7,163,223 B2 * | 1/2007 | Wesling | B62K 25/08 137/493.4 |
| 7,374,028 B2 * | 5/2008 | Fox | F16F 9/44 188/322.14 |
| 8,182,617 B2 * | 5/2012 | Moyer | C22C 38/04 148/230 |
| 8,302,746 B2 * | 11/2012 | Azekatsu | F16F 9/5126 188/322.15 |
| 8,844,687 B2 * | 9/2014 | Yu | F16F 9/5126 188/280 |
| 9,150,077 B2 * | 10/2015 | Roessle | B60G 13/08 |
| 2003/0029684 A1 | 2/2003 | Forster | |
| 2007/0080515 A1 * | 4/2007 | McAndrews | B62K 25/08 280/276 |
| 2011/0198172 A1 * | 8/2011 | Whan | F16F 9/465 188/322.13 |
| 2012/0090931 A1 * | 4/2012 | Krazewski | F16F 9/49 188/288 |
| 2012/0181126 A1 * | 7/2012 | de Kock | F16F 9/5126 188/282.8 |
| 2013/0161138 A1 * | 6/2013 | Barefoot | F16F 9/461 188/282.1 |

* cited by examiner

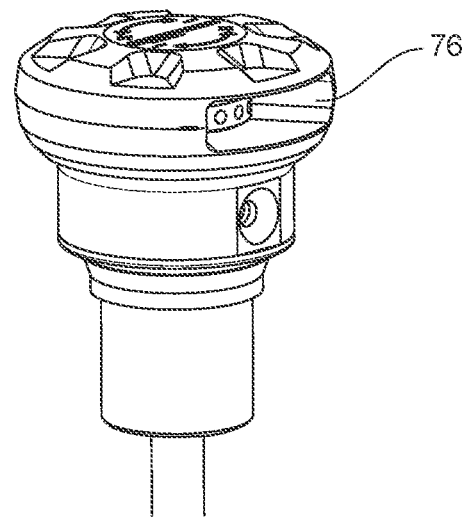
Figure 5
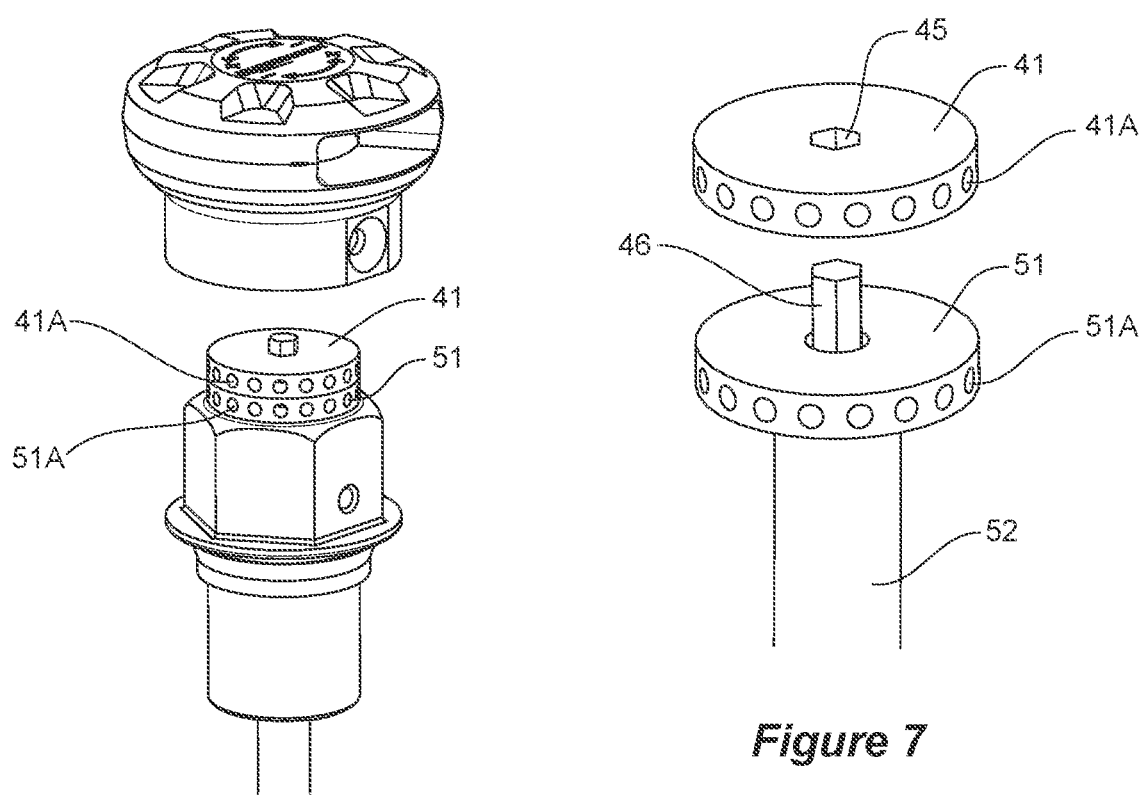
Figure 6
Figure 7

HYDRAULIC DAMPER

CROSS-REFERENCE TO RELATED APPLICATIONS

The present application claims priority from Australian Provisional Patent Application No. 2019901520 titled "HYDRAULIC DAMPER" and filed on 3 May 2019, the content of which is hereby incorporated by reference in its entirety.

TECHNICAL FIELD

The present invention relates to a hydraulic damper.

BACKGROUND

A hydraulic damper converts kinetic energy into heat energy using viscous friction of a non-compressible fluid (such as hydraulic oil). Typically, this is achieved by passing oil through restricted apertures (also known as ports) and valve mechanisms (such as shim stacks on either side of the apertures) which generate hydraulic resistance. Damping coefficient adjustments can be made by varying the aperture size and/or varying the configuration of the valve mechanism.

A typical hydraulic damper comprises a damper cylinder, piston rod, hydraulic piston and gas reservoir. The damper cylinder is full of hydraulic oil and sealed on both ends. The hydraulic piston is attached to the piston rod, which enters the hydraulic cylinder through rod seals. The hydraulic piston moves through the hydraulic oil when forces are applied to the piston rod. As the piston rod enters the sealed damper cylinder, the internal oil volume capacity is reduced, wherein this volume of oil is taken up by the gas reservoir which can take many different forms depending on the damper design, such as mono-tube, twin tube, or remote reservoir.

In high speed damping, oil is displaced with enough force to overcome the valving arrangement and be passed through the hydraulic piston. Most dampers of this kind have fixed bump (compression) and rebound (extension) damping characteristics. This is undesirable as the performance of the damper is impeded if the damping characteristics are unable to be adjusted.

Attempts have been made to adjust the low speed damping characteristics, for instance, by locating adjustment mechanisms around the cylinder in a twin tube set up or along with the remote reservoir, however this greatly increases the oil flow path, significantly impeding the responsiveness of the damper in low speed damping.

It is against this background, that the present disclosure has been developed.

SUMMARY

According to a first aspect, there is provided a hydraulic damper, comprising a damper cylinder containing a fluid, a piston slidably retained within the damper cylinder, the piston dividing the damper cylinder into a first fluid chamber and a second fluid chamber, a piston rod for driving the piston within the damper cylinder, the piston rod comprising a fluid passageway having a first opening in fluid communication with the first fluid chamber, and a second opening in fluid communication with the second fluid chamber, wherein the piston is slidably moveable along the direction of elongation of the damper cylinder in compression and rebound, where compression results in a flow of fluid through the fluid passageway from the first fluid chamber to the second fluid chamber, and rebound results in a flow of fluid through the fluid passageway from the second fluid chamber to the first fluid chamber, and an adjustment mechanism located within the fluid passageway between the first opening and second opening and comprising a compression adjustment means for adjusting the restriction of fluid flow through the fluid passageway when the piston is in compression; and a rebound adjustment means for adjusting the restriction of fluid flow through the fluid passageway when the piston is in rebound.

In one form, the adjustment mechanism further comprises a float assembly, slidably retained within the fluid passageway and configured to allow fluid to flow through the fluid passageway, while also being driven by the flow of fluid through the fluid passageway, such that when the piston moves in compression, at least a portion of the float assembly will be driven toward the second opening, and when the piston moves in rebound, at least a portion of the float assembly will be driven toward the first opening, the float assembly retained within the fluid passageway by a compression barrier for restricting movement of the float assembly when the piston moves in compression, and a rebound barrier for restricting movement of the float assembly when the piston moves in rebound, such that when the piston moves in compression, at least a portion of the float assembly bears against the compression barrier, and when the piston moves in rebound, at least a portion of the float assembly bears against the rebound barrier, and wherein the compression adjustment means comprises a compression valve located adjacent to the compression barrier, such that when the float assembly bears against the compression barrier, the compression valve interacts with the float assembly to restrict the flow of fluid through the fluid passageway, the compression valve being adjustably moveable with respect to the compression barrier, in order to adjust the restriction of fluid flow through the fluid passageway when the float assembly bears against the compression barrier, and wherein the rebound adjustment means comprises a rebound valve located adjacent to the rebound barrier, such that when the float assembly bears against the rebound barrier, the rebound valve interacts with the float assembly to restrict the flow of fluid through the fluid passageway, the rebound valve being adjustably moveable with respect to the rebound barrier, in order to adjust the restriction of fluid flow through the fluid passageway when the float assembly bears against the rebound barrier.

In one form, the compression and rebound valves are separately adjustable between open and fully closed positions.

In one form, the float assembly comprises a compression aperture, and the compression valve comprises a tapered head, such that movement of the compression valve toward the compression barrier results in the compression valve increasing the restriction of fluid flow through the compression aperture, and where movement of the compression valve away from the compression barrier results in the compression valve decreasing the restriction of fluid flow through the compression aperture, and wherein the float assembly further comprises a rebound aperture, and the rebound valve comprises a tapered head, such that movement of the rebound valve toward the rebound barrier results in the rebound valve increasing the restriction of fluid flow through the rebound aperture, and where movement of the rebound valve away from the rebound barrier results in the rebound valve decreasing the restriction of fluid flow through the rebound aperture.

In one form, the float assembly comprises a compression member featuring the compression aperture, a rebound member featuring the rebound aperture, and a biasing means for pushing the compression and rebound members apart, wherein when the damper is in compression, fluid flows through the fluid passageway causing the rebound member to move away from the rebound valve toward the second opening, against pushing force of the biasing means, such that the rebound valve and rebound aperture are not interacting to restrict fluid flow, and wherein when the damper is in rebound, fluid flows through the fluid passageway causing the compression member to move away from the compression valve toward the first opening, against the pushing force of the biasing means, such that the compression valve and compression aperture are not interacting to restrict fluid flow.

In one form, the biasing means is in the form of a compression spring.

In one form, the position of the compression and rebound valves are adjusted via compression and rebound adjustment mechanisms, and wherein the piston rod comprises a hollow shaft extending along its length for accommodating the compression and rebound adjustment mechanisms.

In one form, the compression adjustment mechanism comprises a compression adjustment rod secured to the compression valve and comprising an externally threaded section configured to engage an inner threaded section within the hollow shaft of the piston rod, where by virtue of the threaded relationship between the compression adjustment rod and the piston rod, rotation of the compression rod in a first direction causes the compression valve to move closer to the compression member, and rotation of the compression rod in a second direction causes the compression valve to move further from the compression member.

In one form, the rebound valve features an externally threaded section configured to engage an inner threaded section in the hollow shaft of the piston rod, and where by virtue of the threaded relationship between the rebound valve and the piston rod, rotation of the rebound valve in a first direction causes the rebound valve to move closer to the rebound member, and rotation of the rebound valve in a second direction causes the rebound valve to move further from the rebound member.

In one form, the rebound adjustment mechanism comprises a rebound adjustment rod configured to rotate the rebound valve.

In one form, the compression adjustment rod and compression valve comprise hollow shafts configured to accommodate the rebound adjustment rod.

In one form, the compression and rebound adjustment mechanisms are linear actuators acting on the compression and rebound valves respectively.

In one form, the compression and rebound members are manufactured from a nitrogen-strengthened stainless steel alloy.

According to a second aspect, there is provided an adjustment mechanism for controlling the flow of fluid through a fluid passage in the piston rod of a hydraulic damper, the adjustment mechanism comprising a compression adjustment means for adjusting the restriction of fluid flow through the fluid passageway when the piston is in compression, and a rebound adjustment means for adjusting the restriction of fluid flow through the fluid passageway when the piston is in rebound.

BRIEF DESCRIPTION OF DRAWINGS

Embodiments of the present invention will be discussed with reference to the accompanying drawings wherein:

FIG. 5 is a perspective view of a portion of the hydraulic damper of FIG. 1, detailing the top portion of the damper adjustment mechanism;

FIG. 6 is an exploded perspective view of the portion of the hydraulic damper shown in FIG. 5, revealing the compression and rebound adjuster knobs;

FIG. 7 is an exploded perspective view of a portion of the hydraulic damper, revealing the relationship between the rebound adjuster knob, compression adjuster knob and rebound adjuster rod;

DESCRIPTION OF EMBODIMENTS

Figure 1:
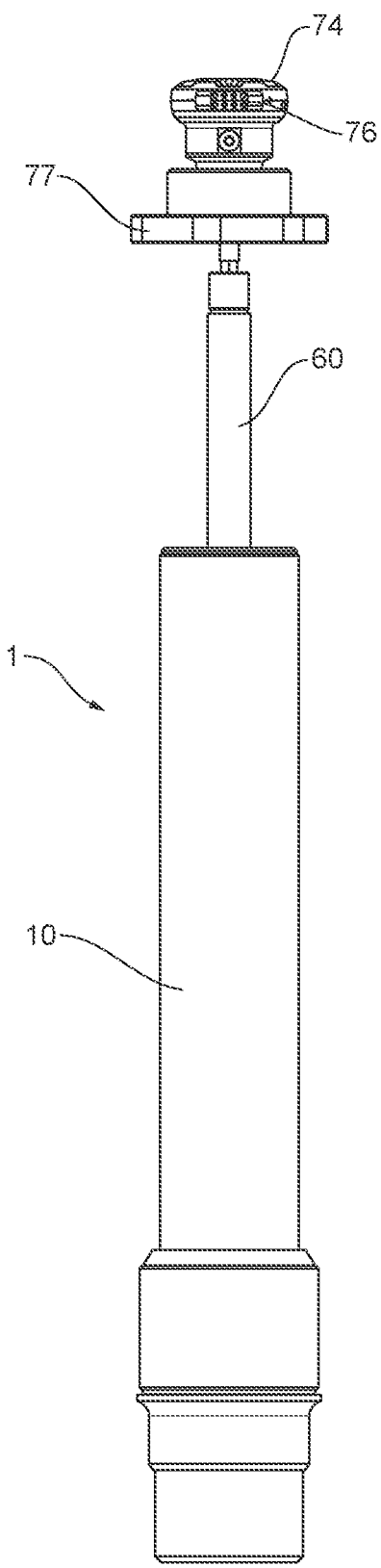
FIG. 1 is a side view of a hydraulic damper, according to an embodiment.
Figure 2:
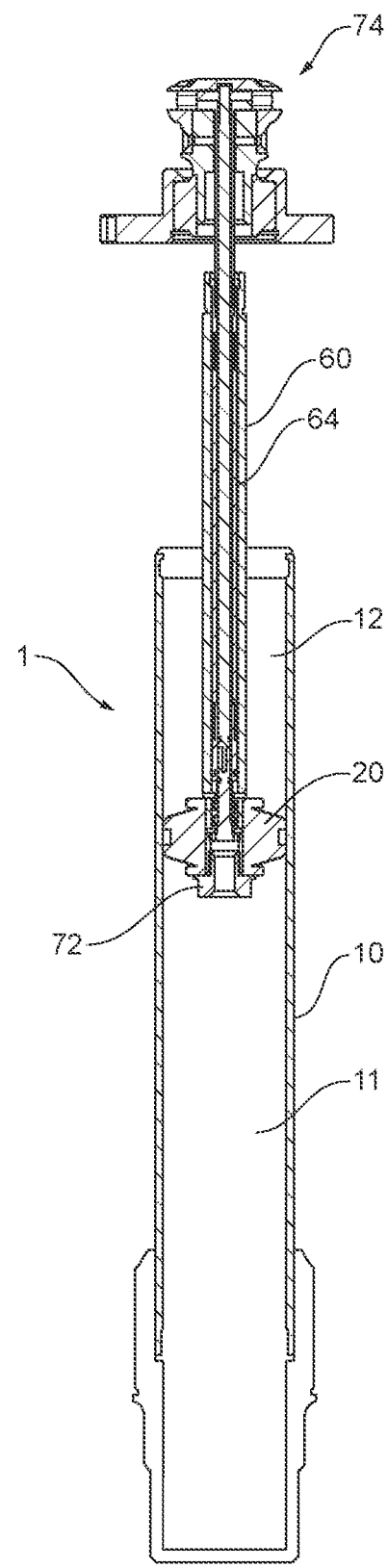
FIG. 2 is a cross-sectional view of the hydraulic damper of FIG. 1.
Figure 3:
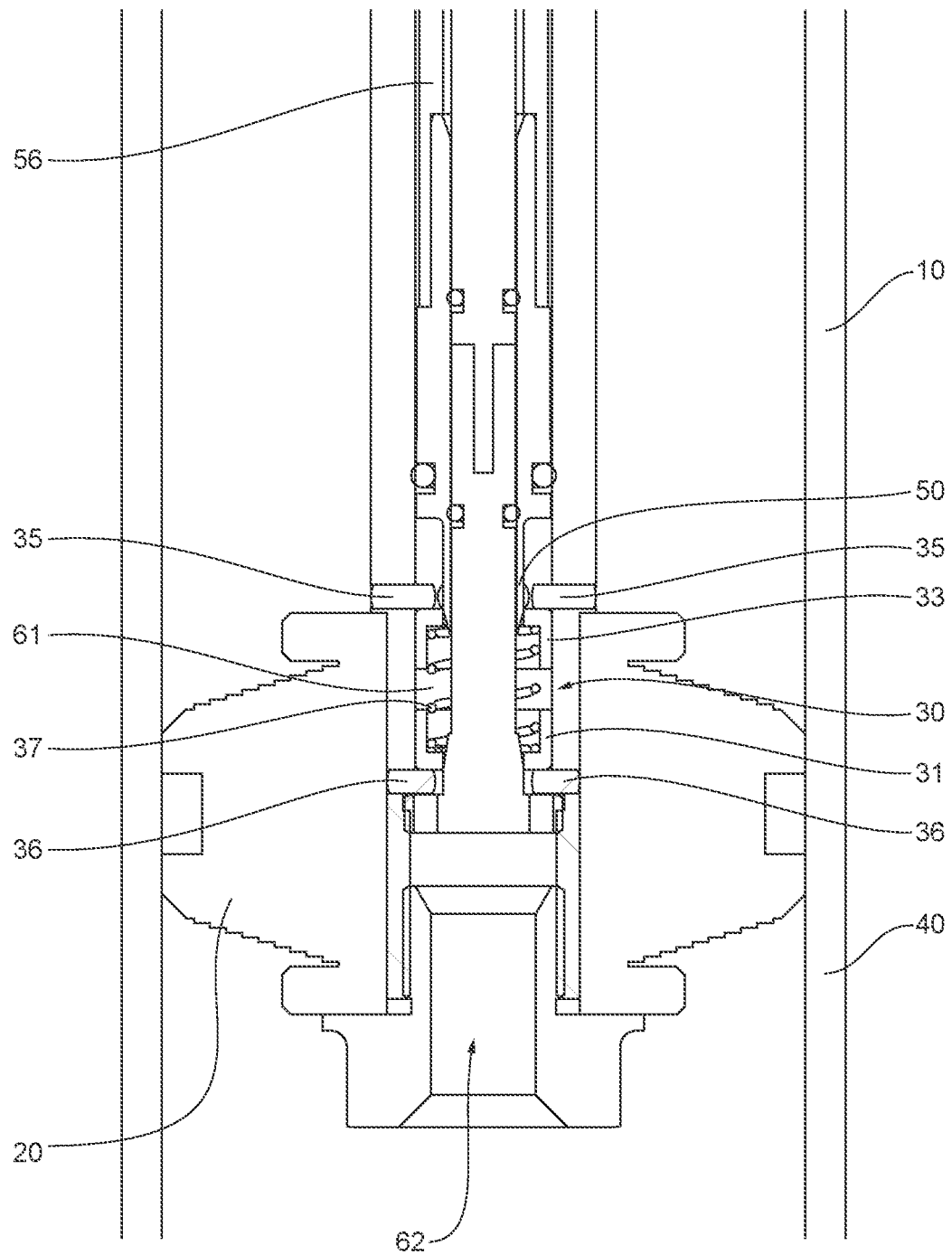
FIG. 3 is a detailed cross-sectional view of a portion of the damper of FIG. 1.
Figure 4:
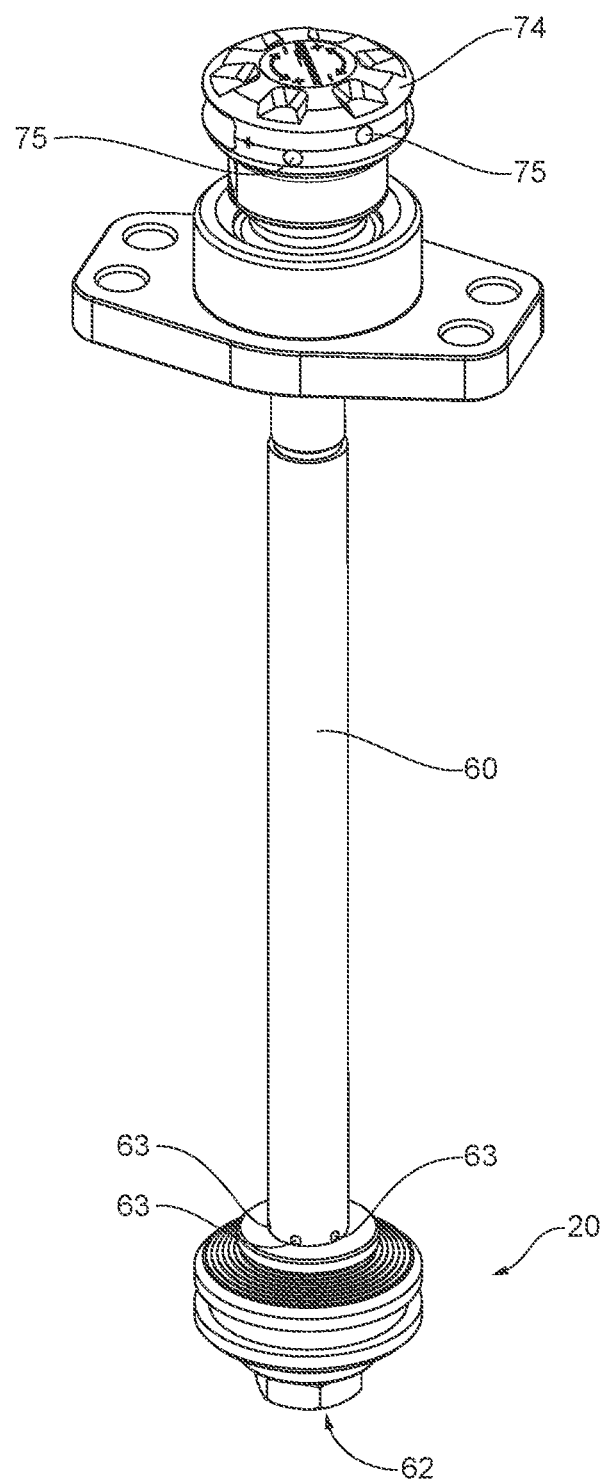
FIG. 4 is a perspective view of the damper of FIG. 1, with the damper cylinder removed to reveal the piston rod and piston.
Figure 13:
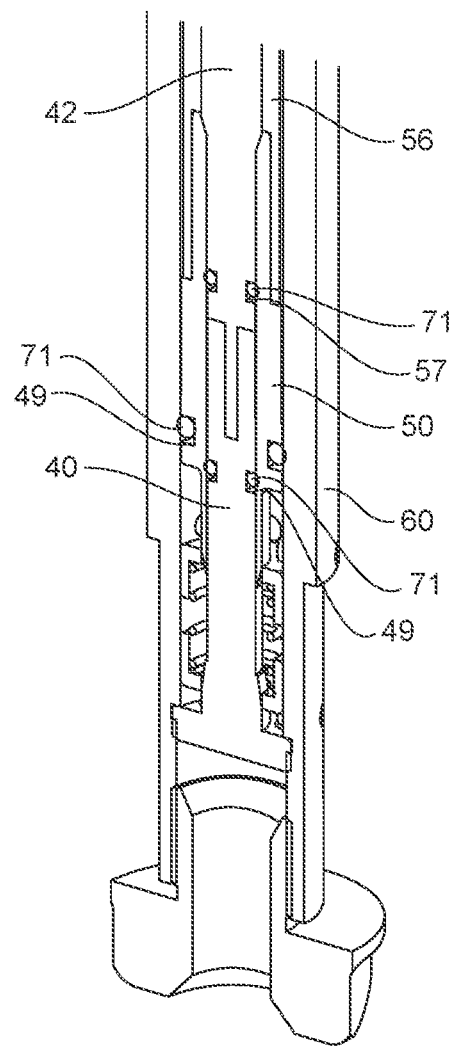
FIG. 13 is a cross-sectional perspective view of a bottom portion of the piston rod, detailing the relationship between the piston rod and the damper adjustment mechanism.
Figure 14:
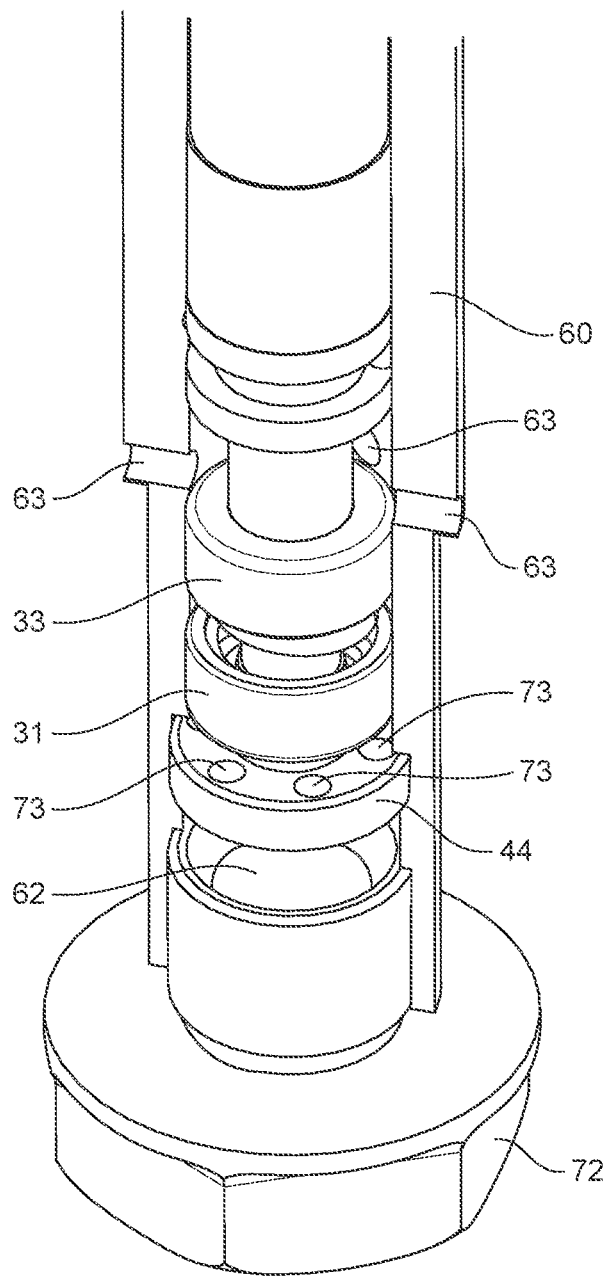
FIG. 14 is a perspective view of the bottom portion of the piston rod, with a portion of the piston rod removed to reveal the bottom portion of the damper mechanism.

Referring now to FIGS. 1 to 14, there is shown a hydraulic damper 1, according to an embodiment. The damper 1 comprises an elongate damper cylinder 10 containing an incompressible fluid (such as a hydraulic oil) and is sealed on both ends. The damper 1 further comprises a piston 20 (as shown in FIGS. 2, 3 and 4) slidably retained within the damper cylinder 10, the piston 20 dividing the damper cylinder 10 into a first fluid chamber 11 and a second fluid chamber 12. The damper 1 also comprises a piston rod 60 for driving the piston 20 within the damper cylinder 10, the piston rod 60 comprising a fluid passageway 61 having a first opening 62 at the base of the piston rod 60 (as best seen in FIGS. 3, 13 and 14) in fluid communication with the first fluid chamber 11, and a second opening in the form of a plurality of apertures 63 in fluid communication with the second fluid chamber 12 and an adjustment means located within the fluid passageway 61 between the first opening 62 and second opening 63. The piston 20 is slidably moveable along the direction of elongation of the damper cylinder 10 in compression and rebound, where compression results in a flow of fluid through the fluid passageway 61 from the first fluid chamber 11 to the second fluid chamber 12, and rebound results in a flow of fluid through the fluid passageway 61 from the second fluid chamber 12 to the first fluid chamber 11. The adjustment means comprises a compression adjustment means for adjusting the restriction of fluid flow through the fluid passageway 61 when the piston 20 is in compression, and a rebound adjustment means for adjusting the restriction of fluid flow through the fluid passageway 61 when the piston 20 is in rebound.

The adjustment means comprises a float assembly 30 (as best seen in FIG. 3) slidably retained within the fluid passageway 61 and configured to allow fluid to flow through the fluid passageway 61, while also being driven by the flow of fluid through the fluid passageway 61, such that when the piston 20 moves in compression, at least part of the float assembly 30 will be driven toward the second opening 63, and when the piston 20 moves in rebound, at least part of the float assembly 30 will be driven toward the first opening 62. The float assembly 30 is retained within the fluid passageway 61 by a compression barrier in the form of one or more dowel pins 35 (as best shown in FIGS. 3 and 15 to 18) for restricting movement of the float assembly 30 when the piston 20 moves in compression (see FIGS. 15 and 16, described in further detail below) and a rebound barrier also in the form of one or more dowel pins 36 (as best shown in FIGS. 3 and 15 to 18) for restricting movement of the float assembly 30 when the piston 20 moves in rebound (see FIGS. 17 and 18, described in further detail below) such that when the piston 20 moves in compression, at least part of the float assembly 30 bears against the compression barrier 35, and when the piston 20 moves in rebound, at least part of the float assembly 30 bears against the rebound barrier 36.

In the embodiment shown, the compression and rebound barriers take the form of dowel pins 35, 36, however it will be appreciated that any suitable barrier means may be employed.

The compression adjustment means comprises a compression valve 50 located adjacent to the compression barrier, such that when at least part of the float assembly 30 bears against the compression barrier, the compression valve 50 interacts with the float assembly to restrict the flow of fluid through the fluid passageway 61. The compression valve 50 is adjustably moveable with respect to the compression barrier, in order to adjust the restriction of fluid flow through the fluid passageway when at least part of the float assembly 30 bears against the compression barrier.

The rebound adjustment means comprises a rebound valve 40 comprising a stem 43 which extends through the float assembly and a valve head 44 located adjacent to the rebound barrier, such that when at least part of the float assembly 30 bears against the rebound barrier, the rebound valve 40 interacts with the float assembly to restrict the flow of fluid through the fluid passageway 61. The rebound valve 40 is adjustably moveable with respect to the rebound barrier, in order to adjust the restriction of fluid flow through the fluid passageway when at least part of the float assembly 30 bears against the rebound barrier.

Referring to FIG. 3, it can be seen that the float assembly comprises a compression member 33 and a rebound member 31 separated by a biasing means (in the form of a compression spring 37), pushing the compression and rebound members 33, 31 apart. As best shown in FIGS. 15 to 18, both the compression member 33 and the rebound member 31 feature apertures 34, 32 configured to interact with tapered valve heads 53, 44 on respective compression and rebound valves 50, 40.

Figure 15:
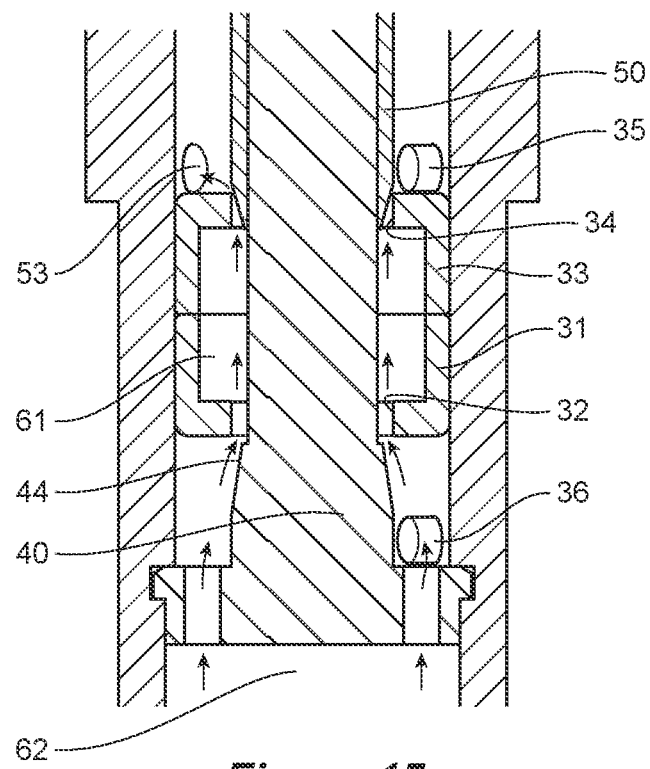
FIG. 15 is a cross-sectional view of the bottom portion of the damper adjustment mechanism when the damper is undergoing compression, and the compression adjustment valve is in the open position.
Figure 16:
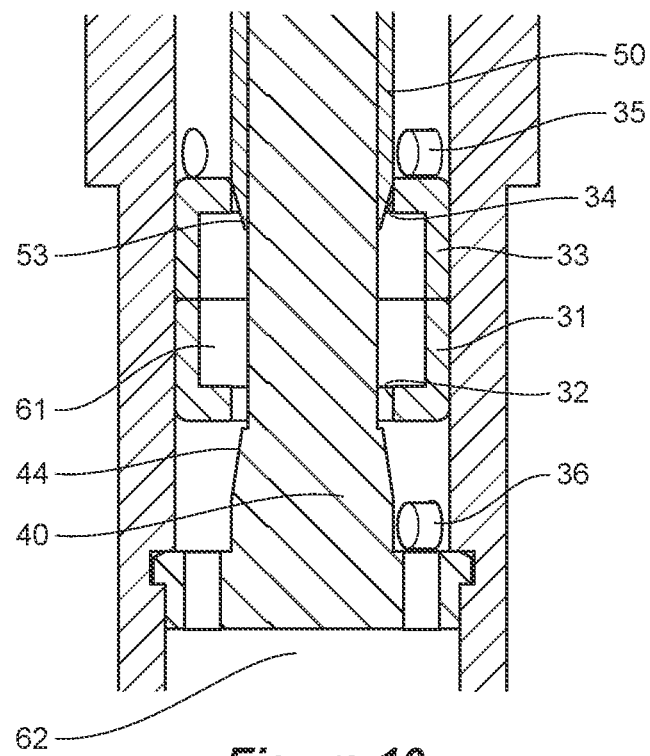
FIG. 16 is a cross-sectional view of the bottom portion of the damper adjustment mechanism when the damper is undergoing compression, and the compression adjustment valve is in the closed position.

Referring now to FIGS. 15 and 16, where there is shown a cross-sectional view of a portion of the hydraulic damper 1 undergoing compression. In compression, as the piston 20 and piston rod 60 move down, fluid flows in to the piston rod 60 through the first opening 62, through the fluid passageway 61 and out of the second opening 63 on the other side of the piston 20. It can be seen that as the fluid flows through the fluid passageway 61, it causes the rebound member 31 to move away from the rebound barrier 36, compressing the spring 37 (not shown) and pushing the rebound member 31 against the compression member 33, such that the rebound aperture 32 is completely open and unrestricted by the rebound valve 40, and fluid flow through the fluid passageway 61 is restricted according to the position of the compression valve 50 with respect to the compression aperture 34. It will be appreciated that fluid flow through the fluid passageway 61 is not influenced by the rebound member 31 and rebound valve 40. As shown in FIGS. 15 and 16 respectively, the compression valve 50 is able to be adjusted between an open position and a fully closed position. It will be appreciated that the closer the compression valve 50 is to the compression member 33, the smaller the opening in the compression aperture 34, resulting in more restriction to fluid flow. It will further be appreciated that when fully closed, fluid is unable to pass through the fluid passageway 61, and instead will pass through valving arrangements in the piston 20 such as restricted apertures (or ports) and valve mechanisms (such as shim stacks on either side of the apertures).

Figure 17:
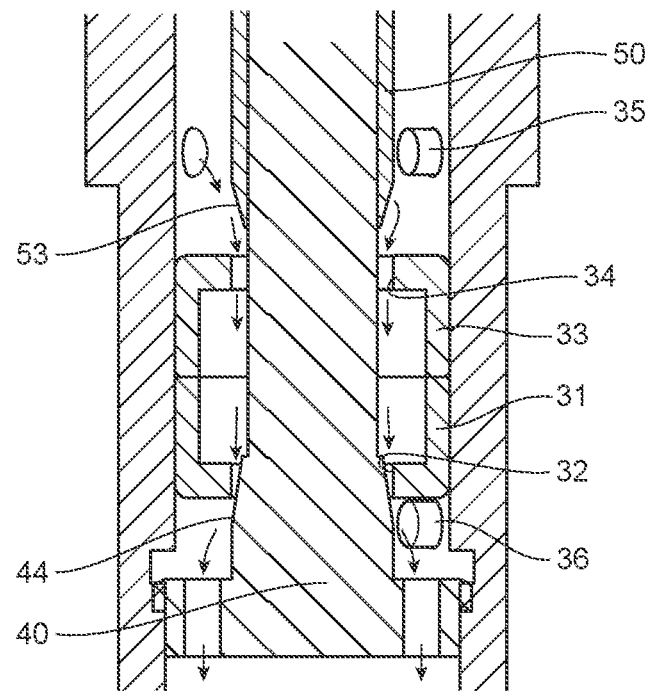
FIG. 17 is a cross-sectional view of the bottom portion of the damper adjustment mechanism when the damper is undergoing rebound, and the rebound adjustment valve is in the open position.
Figure 18:
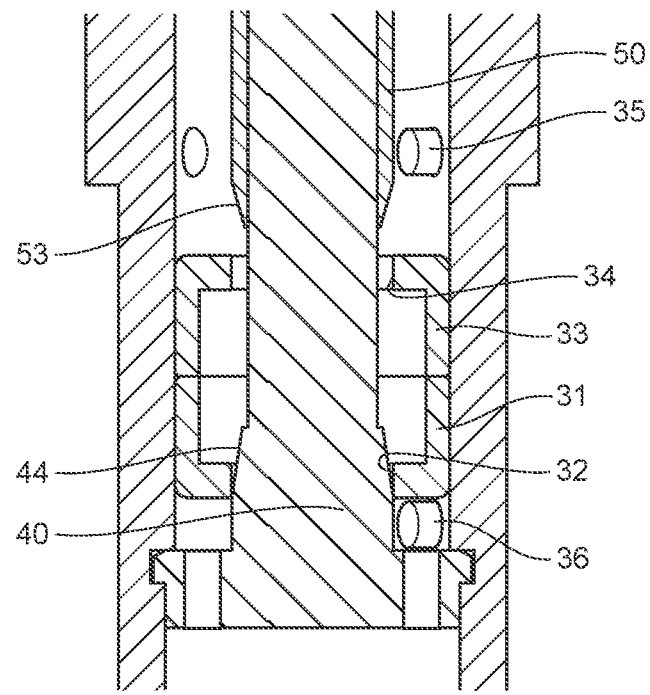
FIG. 18 is a cross-sectional view of the bottom portion of the damper adjustment mechanism when the damper is undergoing rebound, and the rebound adjustment valve is in the closed position.

Referring now to FIGS. 17 and 18, where there is shown a cross-sectional view of a portion of the hydraulic damper 1 undergoing rebound. In rebound, as the piston 20 and piston rod 60 move up, fluid flows in to the piston rod 60 through the second opening 63, through the fluid passageway 61 and out the first opening 62 on the other side of the piston 20. It can be seen that as the fluid flows through the fluid passageway 61, it causes the compression member 33 to move away from the compression barrier 35, compressing the spring 37 (not shown) and pushing the compression member 33 against the rebound member 31, such that the compression aperture 34 is completely open and unrestricted by the compression valve 50, and fluid flow through the fluid passageway 61 is restricted according to the position of the rebound valve 40 with respect to the rebound aperture 32. It will be appreciated that fluid flow through the fluid passageway 61 is not influenced by the compression member 33 and compression valve 50. As shown in FIGS. 17 and 18 respectively, the rebound valve 40 is able to be adjusted between an open position and a fully closed position. It will be appreciated that the closer the rebound valve 40 is to the rebound member 31, the smaller the opening in the rebound aperture 32, resulting in more restriction to fluid flow. It will further be appreciated that when fully closed, fluid is unable to pass through the fluid passageway 61, and instead will pass through the piston 20.

It will be appreciated that the purpose of the spring 37 is to push the compression and rebound members 33, 31 apart in order to keep the damper's 1 response to direction change high. When the piston 20 changes from moving in compression to rebound, the spring 37 immediately pushes the compression and rebound members 33, 31 apart so that they bear against their respective barriers.

It will be appreciated that when the piston 20 begins to move, a certain level of force is required to move the compression and rebound members 33, 31 against the spring 37 and that by varying the characteristics of the spring 37, various damping characteristics are able to be achieved in the initiation of compression and rebound.

The rebound and compression valves 40, 50 are adjusted via respective rebound and compression adjustment mechanisms, comprising rebound and compression adjustment rods actuated by rebound and compression adjuster knobs 41, 51 located within a housing 74 at the top of the piston rod 60. It will be appreciated that the housing is secured to a vehicle mounting point 77, which is in turn secured to the top of the piston rod 60. The housing features apertures 75 through which ball detents (not shown) are secured, wherein the ball detents are configured to engage adjustment apertures 41A, 51A located in the rebound and compression adjuster knobs 41, 51 respectively. The adjuster knobs 41, 51 are actuated through the insertion of a tool through an adjustment window 76 located in the housing 74, wherein the tool is inserted in to an adjustment aperture 41A, 51A and the knob rotated. It will be appreciated that the ball detent allows for a physical and auditory confirmation of a discrete angular rotation of the knob, which corresponds to a discrete linear movement of a respective valve 40, 50.

Figure 8:
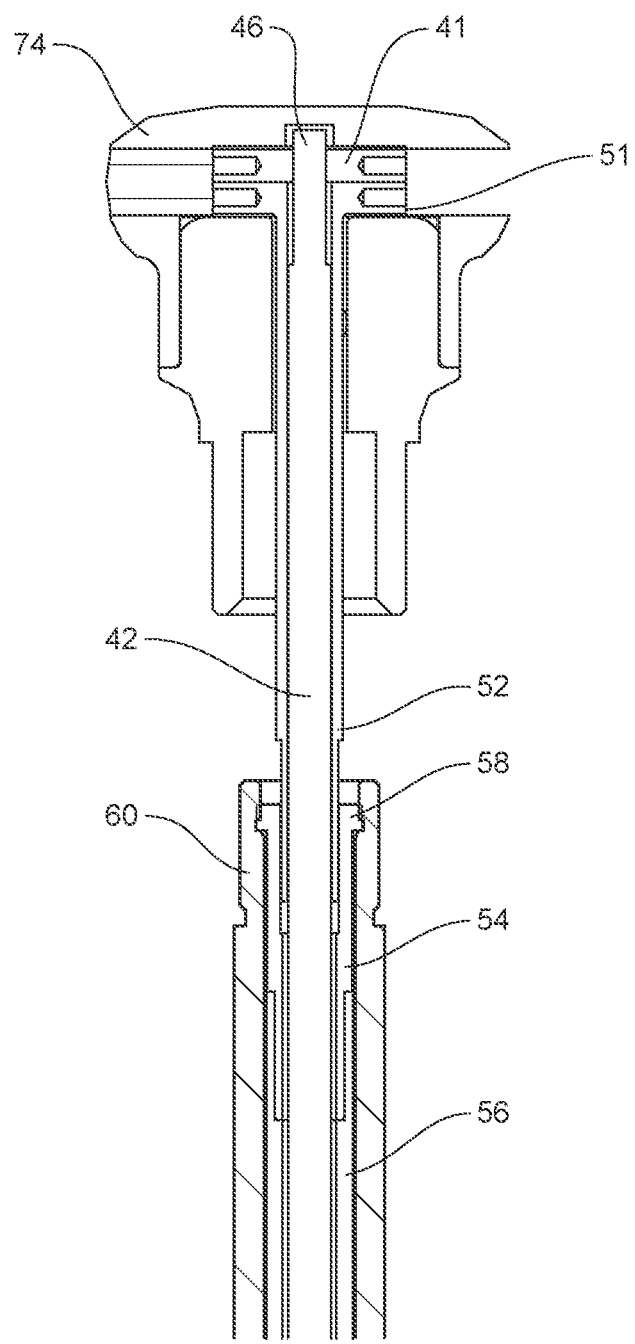
FIG. 8 is a detailed cross-sectional view of the top portion of the damper adjustment mechanism.
Figure 9:
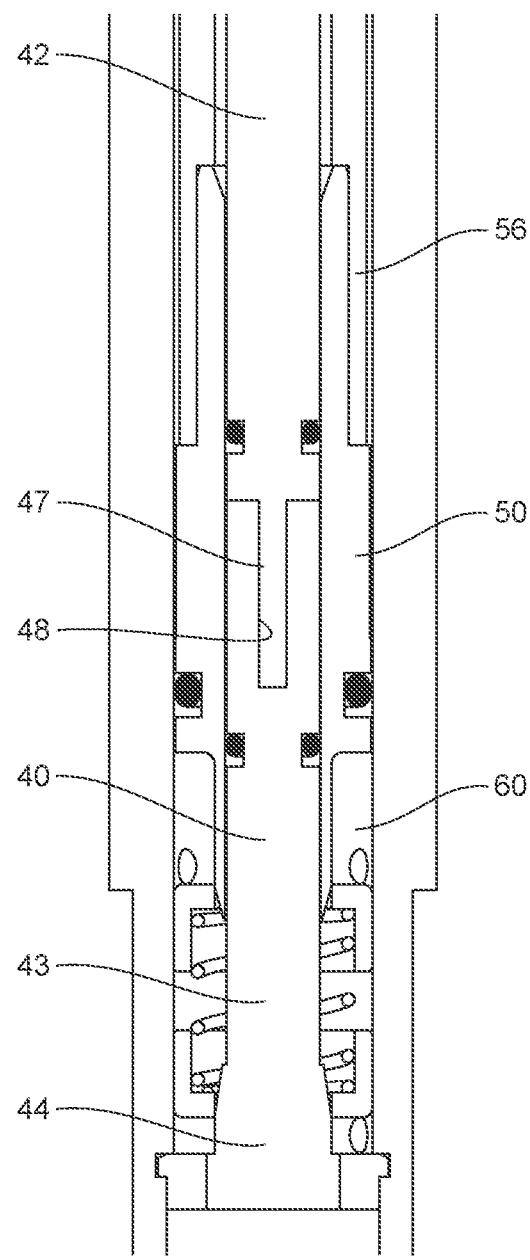
FIG. 9 is a detailed cross-sectional view of the bottom portion of the damper adjustment mechanism.
Figures 10, 11:
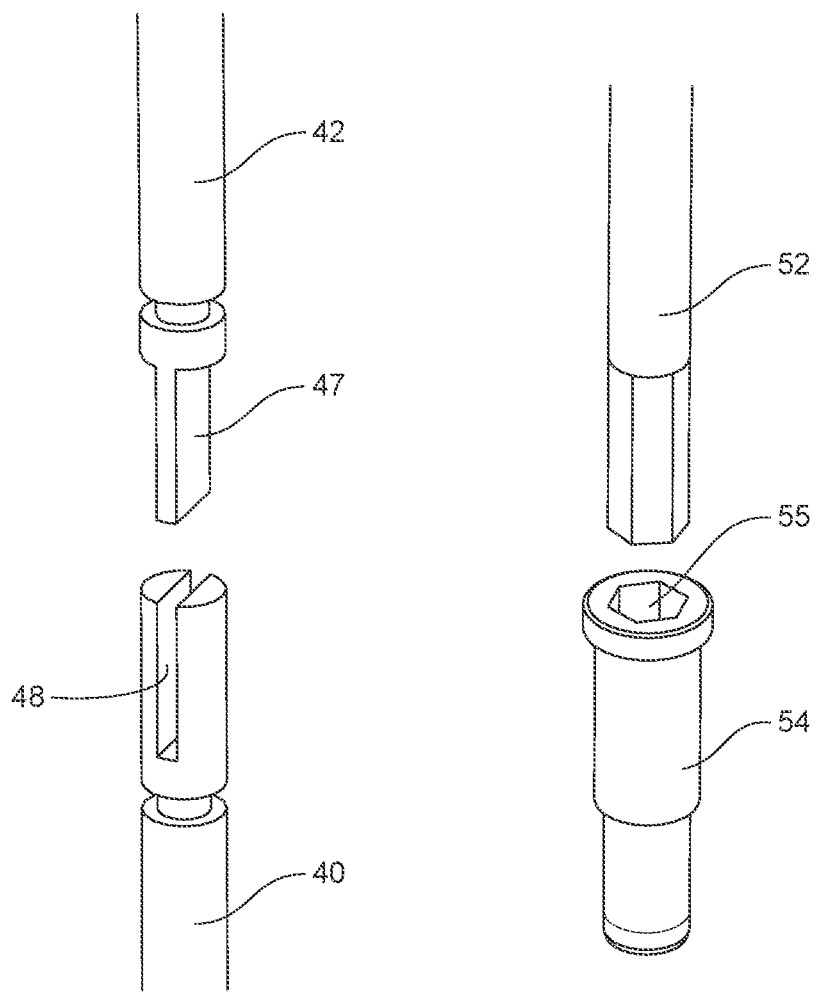
FIG. 10 is an exploded view detailing the relationship between the second end of the rebound adjuster rod and the first end of the rebound adjuster valve.
FIG. 11 is an exploded view detailing the relationship between the second end of the compression adjuster knob and the first end of the first compression member.
Figure 12:
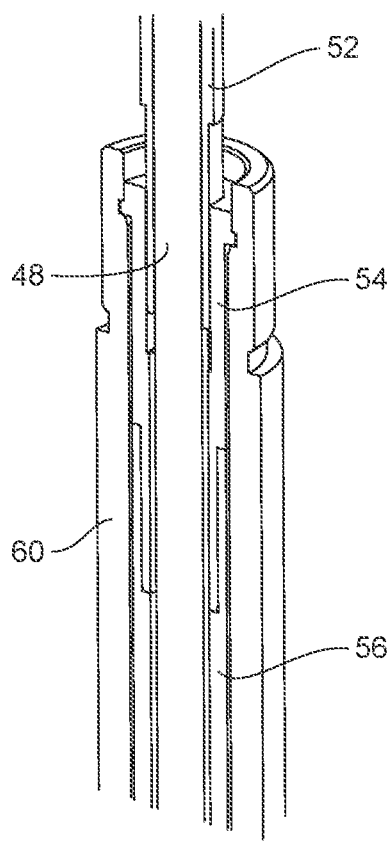
FIG. 12 is a cross-sectional perspective view of a top portion of the piston rod, detailing the relationship between the piston rod and the damper adjustment mechanism.

It can be seen that the piston rod features a hollow shaft 64 that extends from the top to the bottom, in order to accommodate the compression and rebound adjustment mechanisms. As best shown in FIG. 11, the compression adjuster knob 51 features a spigot 52 which is hexagonally shaped on the outside. The spigot 52 locates within a hexagonally shaped opening 55 in a first compression member 54. As best shown in FIG. 8, the first compression member 54 is connected to a second compression member 56, which (as is shown in FIG. 9) is in turn is connected to the compression adjuster valve 50.

In the embodiment shown, the first compression member 54 and the compression adjuster valve 50 are press fit in to either end of the second compression member 56 such that they are secured in relation to each other. The first compression member may be manufactured from brass (or similar low wear material) and features an outer threaded section 58 configured to engage an inner threaded section within the piston rod 60. The second compression member 56 may be manufactured from a hollow aluminium rod (or similar light weight, low cost material). The compression adjuster valve 50 may be manufactured from stainless steel (or similar low-wear material suitable for use in a corrosive environment).

For simplicity, the first compression member 54 and second compression member 56 can also be referred to or considered as a compression rod. While in the embodiment described above, the first and second members and the valve 54, 56, 50 are made from three separate materials, it will be appreciated that in alternative embodiments, they may be made from the same material, or may even be a unitary body.

It will be appreciated that by virtue of the threaded relationship between the outer threaded section 58 on the first compression member 54 and the inner threaded section on the piston rod 60, rotation of the compression adjuster knob 51 in a first direction causes the first compression member 54 to unwind down the piston rod 60 and away from the adjuster knob 51, thus moving the compression valve 50 closer to the compression barrier 35, reducing the size of the opening between the compression valve 50 and the compression member 33, and therefore restricting the flow of fluid through the fluid passageway 61 when the damper 1 is in compression. It will be appreciated that rotation of the compression adjuster knob 51 in a second direction causes the compression valve 50 to move further away from the compression barrier 35, increasing the size of the opening between the compression valve 50 and the compression member 33, and therefore reducing the restriction of the flow of fluid through the fluid passageway 61 when the damper 1 is in compression.

It can be seen that the compression adjuster knob 51, first compression member 54, second compression member 56 and compression valve 50 are hollow, in order to accommodate the rebound adjustment mechanism (described below).

The rebound adjuster knob 41 has a hexagonal aperture 45 configured to engage with a rebound adjustment rod 42, which has a hexagonally shaped head at a first end 46 (to engage with the rebound adjuster knob 41) and has a flat head at the second end 47 configured to engage with a slot 48 formed in the rebound adjuster valve 40. The outside of the rebound adjuster valve head 44 is threaded and is configured to engage with an internally threaded section in the piston rod.

It will be appreciated that by virtue of the threaded relationship between the outer threaded section of the rebound adjuster valve head 44 and the inner threaded section of the piston rod 60, rotation of the knob 41 in a first direction causes the rebound valve 40 to unwind down the piston rod 60 and from the rod 42, thus moving the rebound valve 40 further away from the rebound barrier 36, increasing the size of the opening between the rebound valve 40 and the rebound member 31, and therefore reducing the restriction of the flow of fluid through the fluid passageway 61 when the damper 1 is in rebound. It will be appreciated that rotation of the rebound adjuster knob 41 in a second direction causes the rebound valve 40 to move closer to the rebound barrier 36, reducing the size of the opening between the rebound valve 40 and the rebound member 31, and therefore restricting the flow of fluid through the fluid passageway 61 when the damper 1 is in rebound.

With reference to FIG. 14, it can be seen that the rebound adjuster valve head 44 features apertures 73 that allow fluid to flow through to the first opening 62. It can be seen that the damper 1 comprises a hexagonal head nipple 72 secured in the opening 62 which acts to secure the piston 20 to the piston rod 60. The nipple 72 is configured to engage with the same internally threaded section in the piston rod 60 as the rebound adjuster valve head 44.

With reference to FIG. 13, it can be seen that compression valve 50 features a groove 57 formed in its perimeter in which an O-ring 71 is able to be located in order to prevent fluid from passing the outside of the compression valve 50 and in to the piston rod 60. Also, with reference to FIG. 13 it can be seen that both the rebound valve 40 and the rebound rod 42 feature grooves 49 formed in their respective perimeters in which O-rings 71 are also able to be located in order to prevent fluid from passing between the inside of the compression valve 50 and the outside of the rebound valve 40 and rebound rod 42 and in to the piston rod 60. The O-rings 71 ensuring that all of the fluid is passed through the fluid passageway 61 in the piston rod 60 and back in to the damper cylinder 10.

The piston rod 60 may be manufactured from chromoly steel, while the spring, compression and rebound valves 37, 50, 40 may be manufactured from stainless steel. The compression and rebound members 31, 33 may be manufactured from a material having high strength and superior resistance to galling, as well as corrosion resistant properties, such as a nitrogen-strengthened, austenitic stainless steel alloy such as Nitronic or Gall-Tough. It will be appreciated that other suitable alternative materials may also be employed.

It will be appreciated that both the compression and rebound valves 50, 40 may be moved between positions where flow through the fluid passageway 61 is completely open and unrestricted through to positions where flow through the fluid passageway 61 is completely closed and restricted.

While in the embodiment shown, the compression and rebound valve positions 50, 40 are adjusted via rotation of respective adjustment knobs 51, 41, it will be appreciated that alternative means, such as a linear actuation means may also be employed.

While in the embodiment shown, the rebound adjuster rod 42 is disposed within the hollow compression adjustment members, it will be appreciated that an alternative embodiment may feature compression and rebound rods located alongside each other.

It will be appreciated that the above disclosure provides a damper 1 capable of independent adjustment of compression and rebound damping characteristics, with the adjustment mechanisms able to operate independently of each other.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

What is claimed is:

1. A hydraulic damper, comprising:
    a damper cylinder containing a fluid;
    a piston slidably retained within the damper cylinder, the piston dividing the damper cylinder into a first fluid chamber and a second fluid chamber;
    a piston rod for driving the piston within the damper cylinder, the piston rod comprising
    a fluid passageway having a first opening in fluid communication with the first fluid chamber, and a second opening in fluid communication with the second fluid chamber;
    wherein the piston is slidably moveable along the direction of elongation of the damper cylinder in compression and rebound, where compression results in a flow of fluid through the fluid passageway from the first fluid chamber to the second fluid chamber, and rebound results in a flow of fluid through the fluid passageway from the second fluid chamber to the first fluid chamber; and
    an adjustment mechanism located within the fluid passageway between the first opening, second opening and comprising:
    a float assembly, slidably retained within the fluid passageway and configured to allow fluid to flow through the fluid passageway, while also being driven by the flow of fluid through the fluid passageway, such that when the piston moves in compression, at least a portion of the float assembly will be driven toward the second opening, and when the piston moves in rebound, at least a portion of the float assembly will be driven toward the first opening, the float assembly being retained within the fluid passageway by a compression barrier for restricting movement of the float assembly when the piston moves in compression, and a rebound barrier for restricting movement of the float assembly when the piston moves in rebound, such that when the piston moves in compression, at least a portion of the float assembly bears against the compression barrier, and when the piston moves in rebound, at least a portion of the float assembly bears against the rebound barrier;
        a compression valve located between the float assembly and the second opening and adjacent to the compression barrier, such that when the piston moves in compression, the compression valve interacts with the float assembly to restrict the flow of fluid through the fluid passageway, the compression valve being adjustably movable with respect to the compression barrier in order to adjust the restriction of fluid flow through the fluid passageway when the piston is in compression; and
        a rebound valve located between the float assembly and the first opening and adjacent to the rebound barrier, such that when the piston moves in rebound, the rebound valve interacts with the float assembly to restrict the flow of fluid through the fluid passageway, the rebound valve being adjustably moveable with respect to the rebound barrier in order to adjust the restriction of fluid flow through the fluid passageway when the piston is in rebound.

2. The hydraulic damper as claimed in claim 1, wherein the compression and rebound valves are separately adjustable between open and fully closed positions.

3. The hydraulic damper as claimed in claim 1, wherein the float assembly comprises a compression aperture, and the compression valve comprises a tapered head, such that movement of the compression valve toward the compression barrier results in the compression valve increasing the restriction of fluid flow through the compression aperture, and where movement of the compression valve away from the compression barrier results in the compression valve decreasing the restriction of fluid flow through the compression aperture; and
    wherein the float assembly further comprises a rebound aperture, and the rebound valve comprises a tapered head, such that movement of the rebound valve toward the rebound barrier results in the rebound valve increasing the restriction of fluid flow through the rebound aperture, and where movement of the rebound valve away from the rebound barrier results in the rebound valve decreasing the restriction of fluid flow through the rebound aperture.

4. The hydraulic damper as claimed in claim 3, wherein the float assembly comprises:
 a compression member comprising the compression aperture;
 a rebound member comprising the rebound aperture; and
 a biasing means for pushing the compression and rebound members apart,
wherein when the damper is in compression, fluid flows through the fluid passageway causing the rebound member to move away from the rebound valve toward the second opening, against pushing force of the biasing means, such that the rebound valve and rebound aperture are not interacting to restrict fluid flow, and
wherein when the damper is in rebound, fluid flows through the fluid passageway causing the compression member to move away from the compression valve toward the first opening, against the pushing force of the biasing means, such that the compression valve and compression aperture are not interacting to restrict fluid flow.

5. The hydraulic damper as claimed in claim 4, wherein the biasing means is in the form of a compression spring.

6. The hydraulic damper as claimed in claim 1, wherein the position of the compression and rebound valves are adjusted via compression and rebound adjustment mechanisms, and wherein the piston rod comprises a hollow shaft extending along its length for accommodating the compression and rebound adjustment mechanisms.

7. The hydraulic damper as claimed in claim 6, wherein the compression adjustment mechanism comprises a compression adjustment rod secured to the compression valve and comprising an externally threaded section configured to engage an inner threaded section within the hollow shaft of the piston rod, where by virtue of the threaded relationship between the compression adjustment rod and the piston rod, rotation of the compression rod in a first direction thereof causes the compression valve to move closer to the compression member, and rotation of the compression rod in a second direction thereof causes the compression valve to move further from the compression member.

8. The hydraulic damper as claimed in claim 7, wherein the rebound valve features an externally threaded section configured to engage an inner threaded section in the hollow shaft of the piston rod, and where by virtue of the threaded relationship between the rebound valve and the piston rod, rotation of the rebound valve in a first direction thereof causes the rebound valve to move closer to the rebound member, and rotation of the rebound valve in a second direction thereof causes the rebound valve to move further from the rebound member.

9. The hydraulic damper as claimed in claim 8, wherein the rebound adjustment mechanism comprises a rebound adjustment rod configured to rotate the rebound valve.

10. The hydraulic damper as claimed in claim 9, wherein the compression adjustment rod and compression valve comprise hollow shafts configured to accommodate the rebound adjustment rod.

11. The hydraulic damper as claimed in claim 6, wherein the compression and rebound adjustment mechanisms are linear actuators acting on the compression and rebound valves respectively.

12. The hydraulic damper as claimed in claim 5, wherein the compression and rebound members are manufactured from a nitrogen-strengthened stainless steel alloy.

\* \* \* \* \*